US010846791B2

(12) United States Patent
Kanjlia et al.

(10) Patent No.: US 10,846,791 B2
(45) **Date of Patent: *Nov. 24, 2020**

(54) SYSTEMS AND METHODS FOR MANAGING A CUSTOMER ACCOUNT SWITCH

(71) Applicant: CAPITAL ONE SERVICES, LLC, McLean, VA (US)

(72) Inventors: Gagan Kanjlia, Ashburn, VA (US); Vishal Puri, Ashburn, VA (US); Michael B. Kiernan, Fairfax, VA (US); Evan S. Klein, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/458,334

(22) Filed: Jul. 1, 2019

(65) Prior Publication Data

US 2019/0362418 A1 Nov. 28, 2019

Related U.S. Application Data

(63) Continuation of application No. 15/792,890, filed on Oct. 25, 2017, now Pat. No. 10,373,249, which is a (Continued)

(51) Int. Cl.

| | |
|---|---|
| ***G06K 5/00*** | (2006.01) |
| ***G06Q 40/02*** | (2012.01) |

(Continued)

(52) U.S. Cl.

CPC ........... *G06Q 40/02* (2013.01); *G06Q 20/108* (2013.01); *G06Q 20/227* (2013.01); *G06Q 20/405* (2013.01)

(58) Field of Classification Search

CPC .......... G07F 19/20; G07F 7/1016; G07F 7/12; G07F 7/122

(Continued)

(56) References Cited

U.S. PATENT DOCUMENTS

| | | | |
|---|---|---|---|
| 7,856,386 | B2 | 12/2010 | Hazlehurst et al. |
| 8,392,300 | B1 | 3/2013 | Battula et al. |

(Continued)

*Primary Examiner* — Daniel St Cyr

(74) *Attorney, Agent, or Firm* — Pillsbury Winthrop Shaw Pittman LLP

(57) ABSTRACT

Systems and methods for management of an account switch are disclosed. An account switch management system may include one or more memory devices storing software instructions, and one or more processors configured to execute the software instructions to receive a list of transaction entries to be switched from a first account to a second account and account information associated with the first account and the second account. The one or more processors may also determine a recommendation relating to a customer action based on the transaction entries and the account information. The one or more processors may provide the list of transaction entries and account information and the recommendation to the client device. The one or more processors may also receive a request from the client device to complete an action and transmit a notification to a processing device to complete the action.

18 Claims, 9 Drawing Sheets

Related U.S. Application Data continuation of application No. 14/548,020, filed on Nov. 19, 2014, now Pat. No. 9,830,648.

(60) Provisional application No. 61/909,008, filed on Nov. 26, 2013.

(51) Int. Cl.

| | |
|---|---|
| ***G06Q 20/10*** | (2012.01) |
| ***G06Q 20/22*** | (2012.01) |
| ***G06Q 20/40*** | (2012.01) |

(58) Field of Classification Search

USPC ........................................ 235/380, 382, 379

See application file for complete search history.

(56) References Cited

U.S. PATENT DOCUMENTS

| | | | | |
|---|---|---|---|---|
| 8,606,708 | B1 | 12/2013 | Homier et al. | |
| 9,830,648 | B2 * | 11/2017 | Kanjlia | G06Q 40/02 |
| 10,373,249 | B2 * | 8/2019 | Kanjlia | G06Q 20/108 |
| 2007/0083917 | A1 | 4/2007 | Peterson et al. | |
| 2008/0301037 | A1 | 12/2008 | Monk | |
| 2010/0299253 | A1 * | 11/2010 | Patterson | G06Q 10/06 705/40 |
| 2012/0011071 | A1 | 1/2012 | Pennock et al. | |
| 2012/0166324 | A1 | 6/2012 | Bater | |
| 2015/0142660 | A1 | 5/2015 | Johnston et al. | |

* cited by examiner

Figure 7:
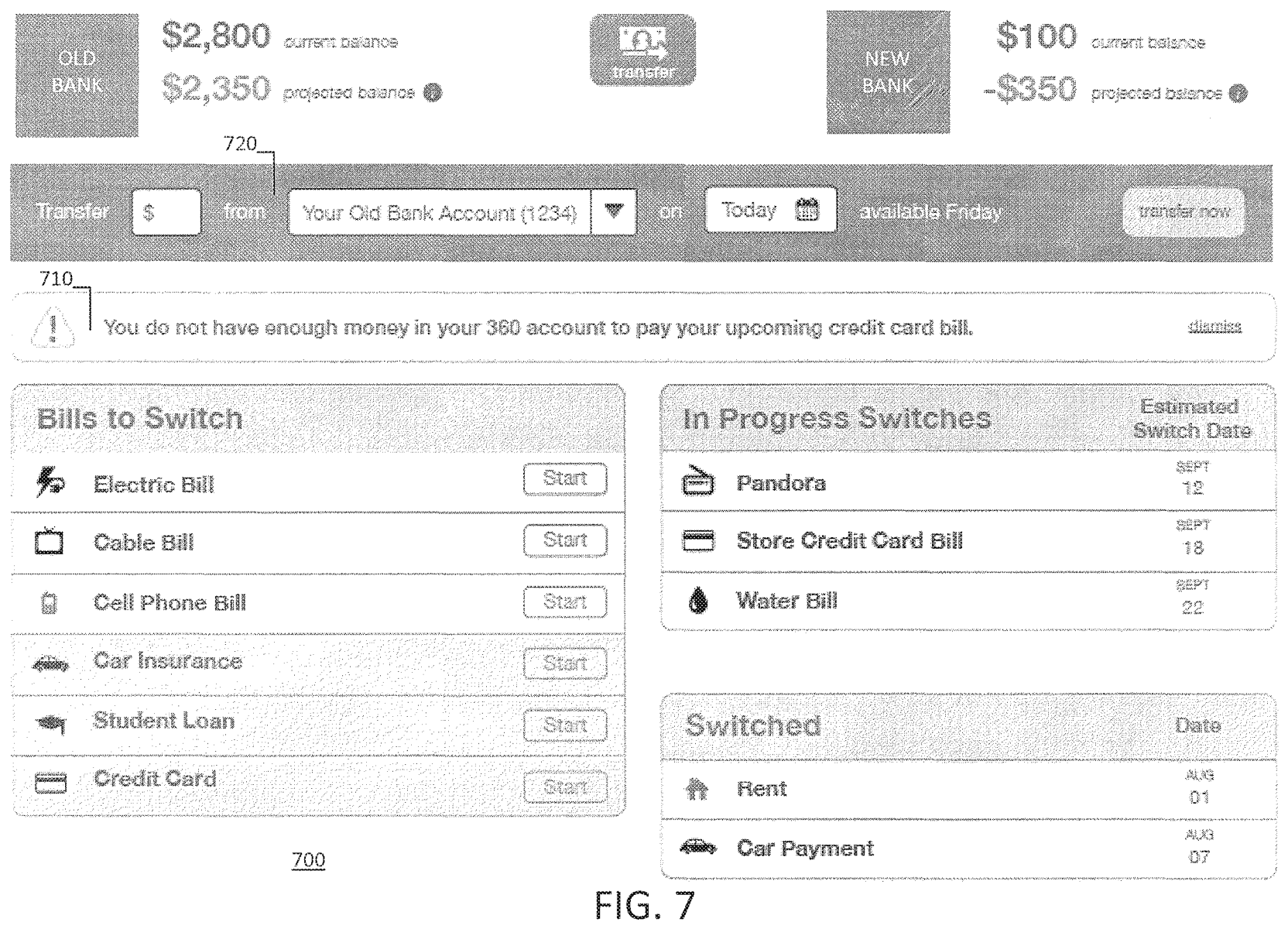

OLD BANK
$2,800 current balance
$2,350 projected balance
transfer
NEW BANK
$100 current balance
-$350 projected balance Transfer $ from Your Old Bank Account (1234) on Today available Friday
transfer now

720

710

You do not have enough money in your 360 account to pay your upcoming credit card bill.
dismiss Bills to Switch
Electric Bill Start
Cable Bill Start
Cell Phone Bill Start
Car Insurance Start
Student Loan Start
Credit Card Start In Progress Switches
Estimated Switch Date
Pandora SEPT 12
Store Credit Card Bill SEPT 18
Water Bill SEPT 22

Switched
Date
Rent AUG 01
Car Payment AUG 07

Figure 8:
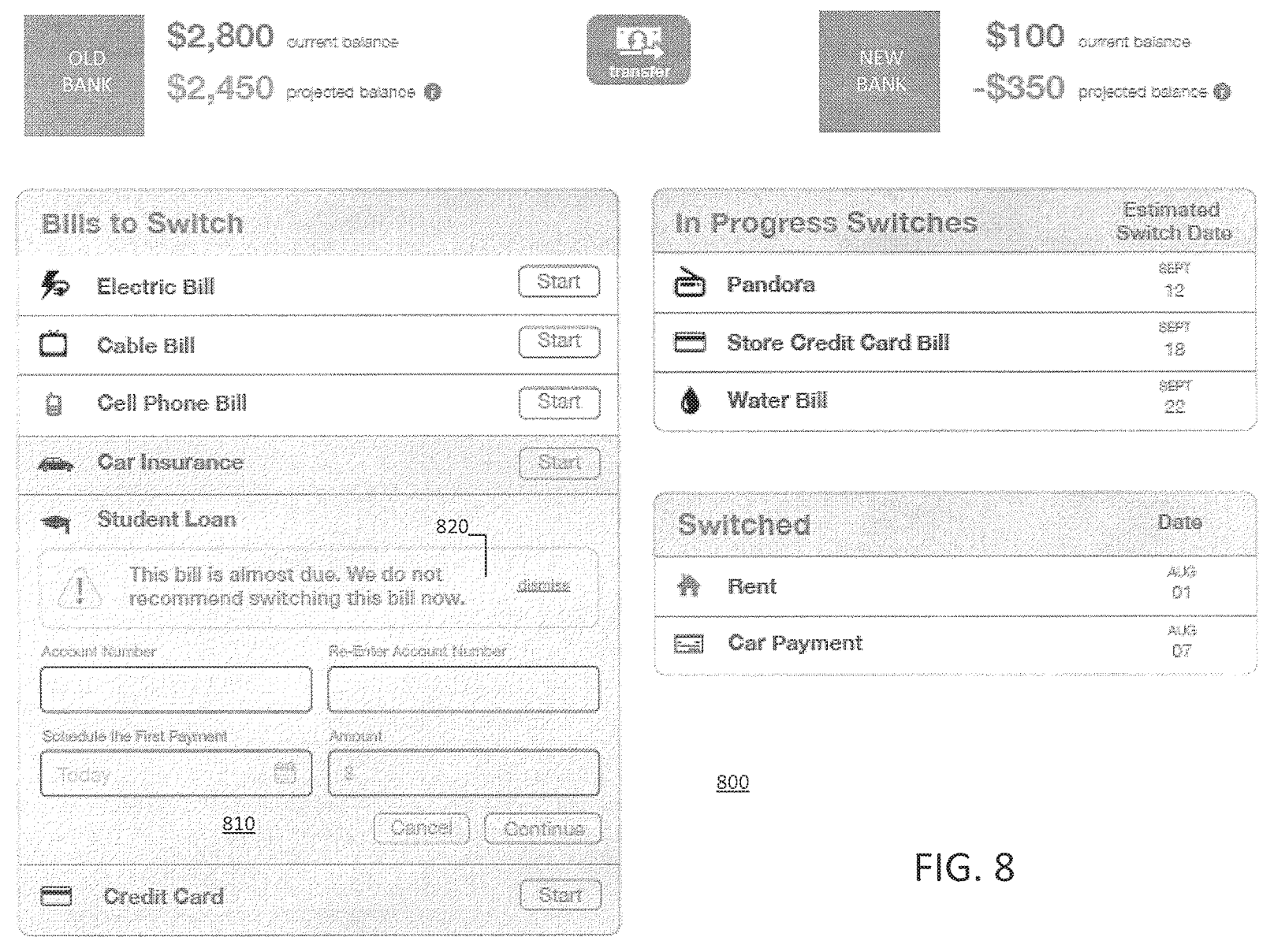

OLD BANK
$2,800 current balance
$2,450 projected balance transfer

NEW BANK
$100 current balance
-$350 projected balance

Bills to Switch
Electric Bill Start
Cable Bill Start
Cell Phone Bill Start
Car Insurance Start
Student Loan
This bill is almost due. We do not recommend switching this bill now. dismiss
820
Account Number
Re-Enter Account Number
Schedule the First Payment
Today
Amount
$
810
Cancel Continue
Credit Card Start In Progress Switches — Estimated Switch Date
Pandora SEPT 12
Store Credit Card Bill SEPT 18
Water Bill SEPT 22

Switched — Date
Rent AUG 01
Car Payment AUG 07

SYSTEMS AND METHODS FOR MANAGING A CUSTOMER ACCOUNT SWITCH

CROSS-REFERENCE TO RELATED APPLICATIONS

This application is a continuation of, and claims the benefit of priority to, U.S. application Ser. No. 15/792,890, filed Oct. 25, 2017, which is a continuation of, and claims the benefit of priority to, U.S. application Ser. No. 14/548,020, filed Nov. 19, 2014 (now U.S. Pat. No. 9,830,648), which claims the benefit of priority to U.S. Provisional Application No. 61/909,008, filed Nov. 26, 2013. The disclosure of the above-reference applications is expressly incorporated by reference to their entireties.

TECHNICAL FIELD

The disclosed embodiments generally relate to financial account processing systems, and more particularly, to systems and methods for managing a customer switch of financial accounts.

BACKGROUND

Currently, financial account providers, such as banks, credit card companies, merchants, lenders, and the like, offer incentives for potential customers to switch their financial accounts from an existing provider. However, once a customer decides to switch financial service providers and opens a new account, the process of switching each recurring transaction to the new account may be difficult and time-consuming for the customer to manage.

After the customer opens a new account, existing technology lacks a quick and simple way for the customer to determine which transactions need to be switched from their old account to their new account. A customer may turn to an account statement to determine which transactions may need to be switched. However, a customer's account statement may list hundreds of past transactions with coded and unclear transaction descriptions, making it difficult for the customer to make a complete list of each transaction to be switched.

Further, once the customer determines which transactions need to be switched to their new account, it may be difficult to plan and carry out a procedure for switching each transaction to the new account that ensures that the switch is efficient and that all transactions occur as necessary. For example, it may be difficult to determine when a particular transaction (e.g., a bill pay) should be switched over to the new account without risk of the bill not being paid or their being insufficient funds in the account from which the payment will be made, resulting in penalty fees.

These potential drawbacks may dissatisfy customers and may even discourage customers from switching financial service providers in the first place. Therefore, there exists a need to allow customers to quickly and easily identify and manage the switching of transactions to a new financial account.

SUMMARY

Consistent with a disclosed embodiment, a method for using an account switch data engine is provided. The method may include receiving, by one or more processors, transaction information relating to previous transactions associated with a first user and a first financial account and generating, by the one or more processors and based on the transaction information, a list of one or more transaction entries corresponding to future transactions that are to be switched from the first financial account to a second financial account. The method may also include receiving, by the one or more processors, input from at least the first or a second user to modify the list, and modifying, by the one or more processors, the list based on the input. The method may additionally include providing, by the one or more processors, a representation of the modified list to a client device.

Consistent with a disclosed embodiment, an account switch data engine system is provided. The account switch data engine system may include one or more memory devices storing software instructions, and one or more processors configured to execute the software instructions to perform one or more of the exemplary processes disclosed herein.

Consistent with another disclosed embodiment, a method for managing a financial account switch is provided. The method may include receiving, by one or more processors, a list of transaction entries to be switched from a first account to a second account, the transaction entries relating to transactions involving the first account and account information associated with the first account and the second account. The method may also include determining, by the one or more processors, a recommendation relating to a customer action associated with the first and/or second account, based on the transaction entries and the account information. The method may further include providing, by the one or more processors, the list of transaction entries, the account information, and the recommendation to a client device. The method may additionally include receiving, by the one or more processors, a request from the client device to complete an action relating to the first and/or second account, and transmitting, by the one or more processors, a notification to a processing device to complete the requested customer action.

Consistent with another disclosed embodiment, an account switch management system is provided. The account switch management system may include one or more memory devices storing software instructions, and one or more processors configured to execute the software instructions to perform one or more of the exemplary processes disclosed herein.

Consistent with other disclosed embodiments, tangible computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIGS. 6-9 depict exemplary user interfaces that may be displayed and used by a customer managing an account switch, consistent with disclosed embodiments.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
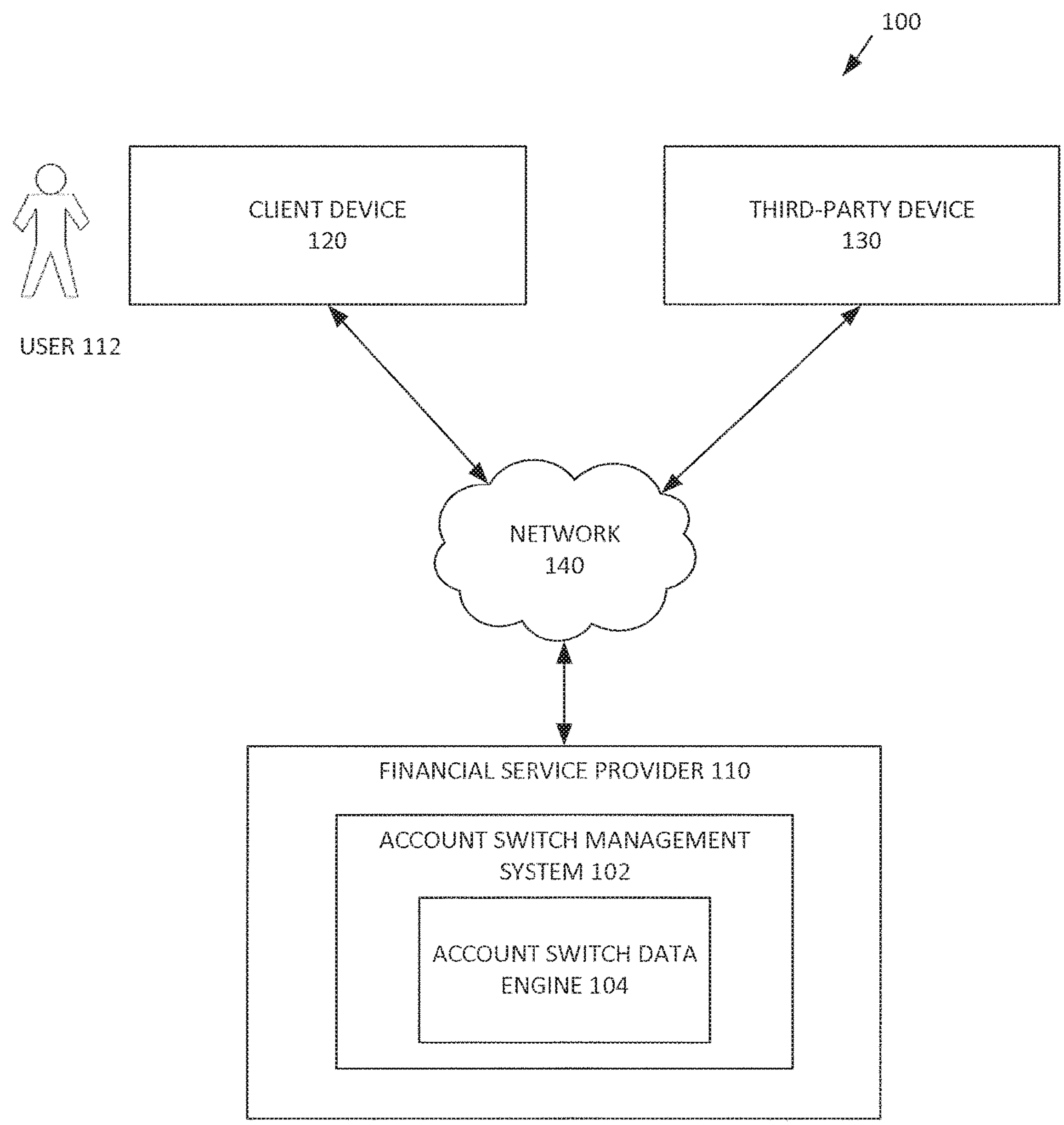
FIG. 1 is a block diagram of an exemplary system, consistent with disclosed embodiments.

FIG. 1 shows an exemplary system 100 that may be configured to perform one or more software processes that, when executed, provide one or more aspects of the disclosed embodiments. The components and arrangement shown in FIG. 1 is not intended to be limiting to the disclosed embodiment as the components used to implement the processes and features disclosed here may vary.

In accordance with certain disclosed embodiments, system 100 may include an account switch management device 102, one or more client devices 120, one or more third-party devices 130, and network 140. Other components known to one of ordinary skill in the art may be included in system 100 to process, transmit, provide, and receive information consistent with the disclosed embodiments.

Account switch management system 102 may be a computer-based system including computer system components, such as one or more servers, desktop computers, workstations, tablets, hand held computing devices, memory devices, and/or internal network(s) connecting the components. In one embodiment, account switch management system 102 may be a server that includes one or more processor(s), memory devices, and interface components. Account switch management system 102 may be a single server or may be configured as a distributed computer system including multiple servers or computers that interoperate to perform one or more of the processes and functionalities associated with the disclosed embodiments. In certain embodiments, account switch management system 102 may be a server that is associated with a financial account provider 110, such as, for example, a bank, lender, merchant, credit card provider, and any other entity that provides financial accounts to customers. Financial accounts may include, for example, credit card accounts, checking accounts, savings accounts, loans, investment accounts, and any other type of account relating to financial products. In one aspect, financial service provider 110 may provide services for switching the customers' existing financial accounts to financial accounts provided by financial service provider 110.

Account switch management system 102 may include an account switch data engine 104. Account switch data engine 104 may be a computing component and/or program configured to execute instructions to perform one or more processes consistent with disclosed embodiments. For example, account switch data engine 104 may be configured to perform a process to generate a final checklist of transactions to be switched. In some aspects, the exemplary process may be, at least partially, an automated process that includes generating the final checklist based on transaction data associated with a customer's previous financial account. Account switch data engine 104 may transform the transaction data into a form that allows the customer and account switch management system 102 to perform an account switch.

Client device 120 may be one or more computer systems. For example, client device 120 may include a general purpose or notebook computer, a mobile device with computing ability (e.g., smart phone, tablet, etc.), a server, a desktop computer, tablet, or any combination of these computers and/or affiliated components. In one embodiment, each client device 120 may be a computer system or device that is operated by a user 112 who is a customer or a potential customer of a financial service provider.

Client device 120 may be configured with storage that stores one or more operating systems that perform known operating system functions when executed by one or more processors. By way of example, the operating systems may include Microsoft Windows™, Unix™, Linux™, Apple™ Computers type operating systems, Personal Digital Assistant (PDA) type operating systems, such as Microsoft CE™, or other types of operating systems. Accordingly, embodiments of the disclosed invention will operate and function with computer systems running any type of operating system. Client device 120 may also include communication software that, when executed by a processor, provides communications with network 140, such as Web browser software, tablet or smart hand held device networking software, etc. Client device 120 may be a device that executes mobile applications, such as a tablet or mobile device.

Third-party device 130 may be one or more computer systems associated with a third-party. Third-party device 130 may include one or more computing systems that are configured to perform computer-implemented processes, such as a server, desktop, laptop, mobile device, etc. Third-party device 130 may be associated with an entity that may arrange to transact with a customer. For example, third-party device 130 may be associated with an entity that receives a payment from a customer (e.g., bill payment to a merchant), delivers a payment to a customer (e.g., direct deposit from a financial service provider, such as an employer's bank), and/or processes a payment to or from a customer (e.g., ACH processing). Third party device 130 may also offer connectivity to a user's previous online bank account (e.g., accessed through input of username and password) in order to obtain transactions for use with account switch data engine 104.

In one example, a third-party device 130 may be associated with a merchant, such as one or more providers of goods and/or services, such as a retailer, etc. Third-party device 130 may be configured to perform financial transaction processes, such as receiving, processing, and handling payment transactions associated with the sale of goods and/or services provided by the associated merchant. Third-party device 130 may be configured to receive payments from a financial account held by a customer of financial service provider 110. In one example, the payments may be recurring payments to the merchant associated with third-party device 130 for goods and/or services received by the customer (e.g., payments associated with a household bill, such as an electric bill). Third-party device 130 may communicate with financial service provider 110 (i.e., a computing system associated with financial service provider 110) to allow transfer of funds from the customer account to the merchant for making one or more payments.

In another example, a third-party device 130 may be associated with a financial service provider, which may be different from financial service provider 110. In one aspect, the financial service provider may maintain a financial account for the customer (e.g., user 112). For example, the financial account may be a credit card account. The third-party device 130 may be configured to communicate with financial service provider 110 (i.e., a computing system associated with financial service provider 110) to allow transfer of funds from the customer account (held with financial service provider 110) to the other customer account (held with the financial service provider associated with third-party device 130, which may or may not be the same as financial service provider 110), such as for the payment of a credit card bill. In another aspect, third-party device 130 may be associated with a financial service provider configured to make payments to the customer, such as direct deposits into the customer's financial account. For example, third-party device 130 may be associated with a bank through which a customer's employer makes payments to their employees.

In yet another example, a third-party device 130 may be associated with a financial transaction processing service, such as an automated clearing house. In this instance, third-party device 130 may be configured to process transactions to send money to or from a customer's financial account. For example, third-party device 130 may be configured to receive funds from a customer account and send the funds to a merchant to make a payment owed by the customer. Similarly, third-party device 130 may be configured to receive funds from a financial service provider and send the funds to the customer's account to make a payment to the customer.

Network 140 may be any type of network that provides communications, exchanges information, and/or facilitates the exchange of information between account switch management system 102, other components of financial service provider 110, client devices 120, and/or third-party devices 130. In one embodiment, network 140 may be the Internet, a Local Area Network, or other suitable connection(s) that enables system 100 to send and receive information between the components of system 100. In other embodiments, one or more components of system 100 may communicate directly through a dedicated communication link(s) (not shown), such as a link between client device 120 and third-party device 130.

In one embodiment, user 112 may operate client device 120 to perform one or more processes associated with account switch management system 102. User 112 may operate client device 120 to communicate with account switch management system 102 to manage an account switch. An account switch may include any instance in which a customer chooses to stop use of one financial account in favor of another financial account. The account switch may include switch of a single transaction normally made using one financial account to another financial account (e.g., paying a bill with a different account), switch of all transactions associated with one financial account to another financial account (e.g., switching to a new account and closing an old account), or something in-between. Transactions may include, for example, deposits into a financial account, such as a direct deposit, and/or payments made from a financial account, such as bills paid by one or more of a payment processer (e.g., ACH), a debit card, or a bill pay system. In an exemplary embodiment, a customer (e.g., user 112) may open a new financial account (e.g., a checking account) with financial service provider 110 and switch some or all transactions from a financial account held with another financial service provider to the new account, using account switch management system 102.

It should be understood that switching of transactions may refer to any process by which a current or future transaction is made through one financial account instead of another financial account. For example, switching of a transaction may refer to changing an arrangement with a third-party such that future transactions occur through one financial account different from another financial account previously used to transact with the third-party. In some embodiments, the third-party may be instructed to transact with the different financial account (e.g., receive a notification), which may be completed via one or more automated and/or manual processes.

In executing the one or more processes associated with an account switch, account switch management system 102 may communicate with one or more third-party device 130. These communications may arrange to complete switches of transactions (e.g., bill payments, direct deposits, etc.) associated with the customer from one financial account to another financial account. For example, account switch management system 102 may communicate with a third-party device 130 associated with a merchant to switch automatic recurring payments made by the customer to the merchant from one financial account (e.g., an old financial account) to another financial account (e.g., a new financial account).

In another aspect, account switch management system 102 may communicate with a third-party device 130 associated with the financial service provider that maintains the financial account from which the customer is switching. For example, account switch management system 102 may communicate with a financial service provider associated with the customer's previous financial account, to instruct the financial service provider to complete transactions with the previous account (e.g., pay a bill, transfer funds to the new account, stop payments, etc.). In this way, the customer may switch accounts used for transactions with third-parties through use of account switch management system 102.

Figure 2:
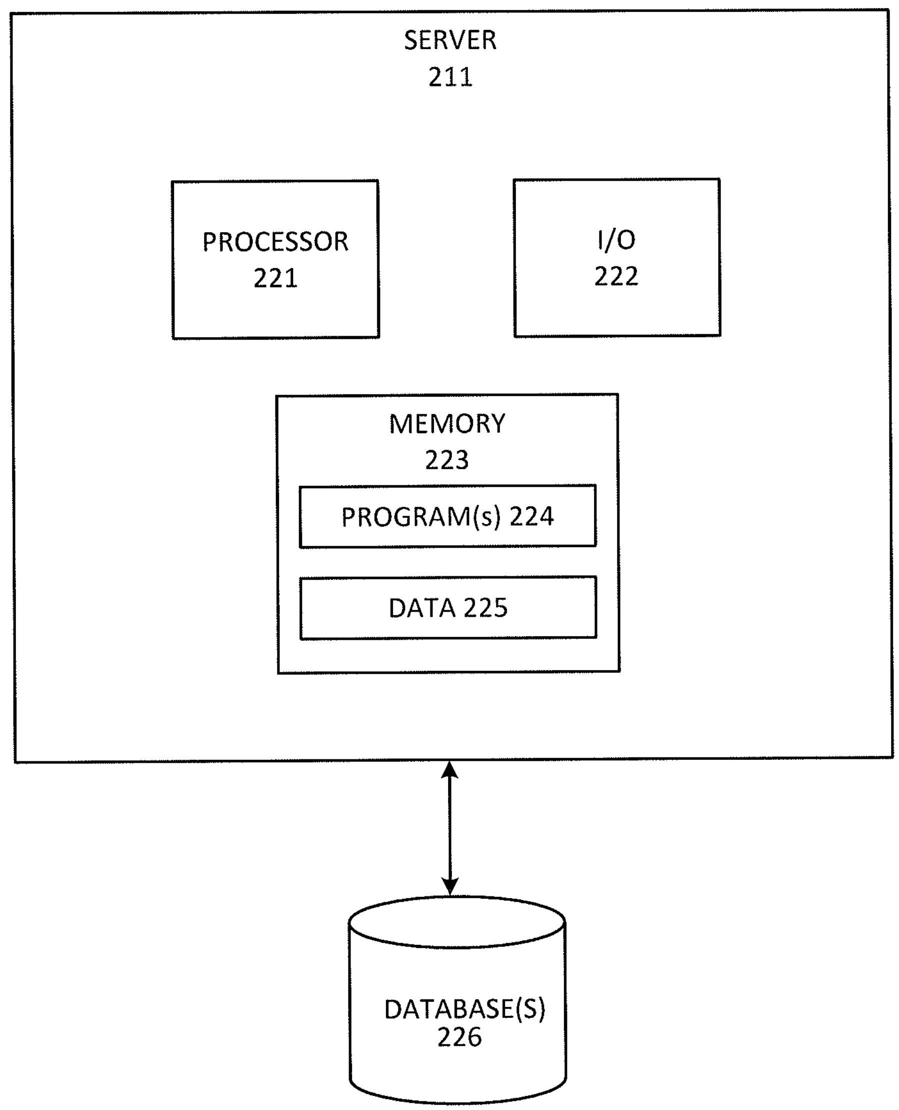
FIG. 2 is a block diagram of an exemplary server, consistent with disclosed embodiments.

FIG. 2 shows an exemplary server 211 for implementing embodiments consistent with the present disclosure. In an exemplary embodiment, server 211 may correspond to account switch management system 102. However, it should be understood that variations of server 211 may be used by another component of financial service provider 110, client device 120, third-party device 130, and/or components thereof.

In one embodiment, server 211 may include one or more processors 221, one or more memories 223, and one or more input/output (I/O) devices 222. Server 211 may take the form of a mobile computing device, general purpose computer, a mainframe computer, or any combination of these components. According to some embodiments, server 211 may comprise web server(s) or similar computing devices that generate, maintain, and provide web site(s) consistent with disclosed embodiments. Server 211 may be standalone, or it may be part of a subsystem, which may be part of a larger system. For example, server 211 may represent distributed servers that are remotely located and communicate over a network (e.g., network 140) or a dedicated network, such as a LAN. Server 211 may correspond to any of client device 120, merchant device 120, and financial service provider device 130.

Processor 221 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 211.

Memory 223 may include one or more storage devices configured to store instructions used by processor 221 to perform functions related to disclosed embodiments. For example, memory 223 may be configured with one or more software instructions, such as program(s) 224 that may perform one or more operations when executed by processor 221. The disclosed embodiments are not limited to separate programs or computers configured to perform dedicated tasks. For example, memory 223 may include a single program 224 that performs the functions of the server 211, or program 224 could comprise multiple programs. Additionally, processor 221 may execute one or more programs located remotely from server 211. For example, client device 120, merchant device 120, and/or financial service provider device 130, may, via server 211, access one or more remote programs that, when executed, perform functions related to certain disclosed embodiments. Memory 223 may also store data 225 that may reflect any type of information in any format that the system may use to perform operations consistent with the disclosed embodiments.

I/O devices 222 may be one or more devices configured to allow data to be received and/or transmitted by server 211. I/O devices 222 may include one or more digital and/or analog communication devices that allow server 211 to communicate with other machines and devices, such as other components of system 100.

Server 211 may also be communicatively connected to one or more database(s) 226. Server 211 may be communicatively connected to database(s) 226 through network 140. Database 226 may include one or more memory devices that store information and are accessed and/or managed through server 211. By way of example, database(s) 226 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, system 200 may include database 226. Alternatively, database 226 may be located remotely from the system 200. Database 226 may include computing components (e.g., database management system, database server, etc.) configured to receive and process requests for data stored in memory devices of database(s) 226 and to provide data from database 226.

Figure 3:
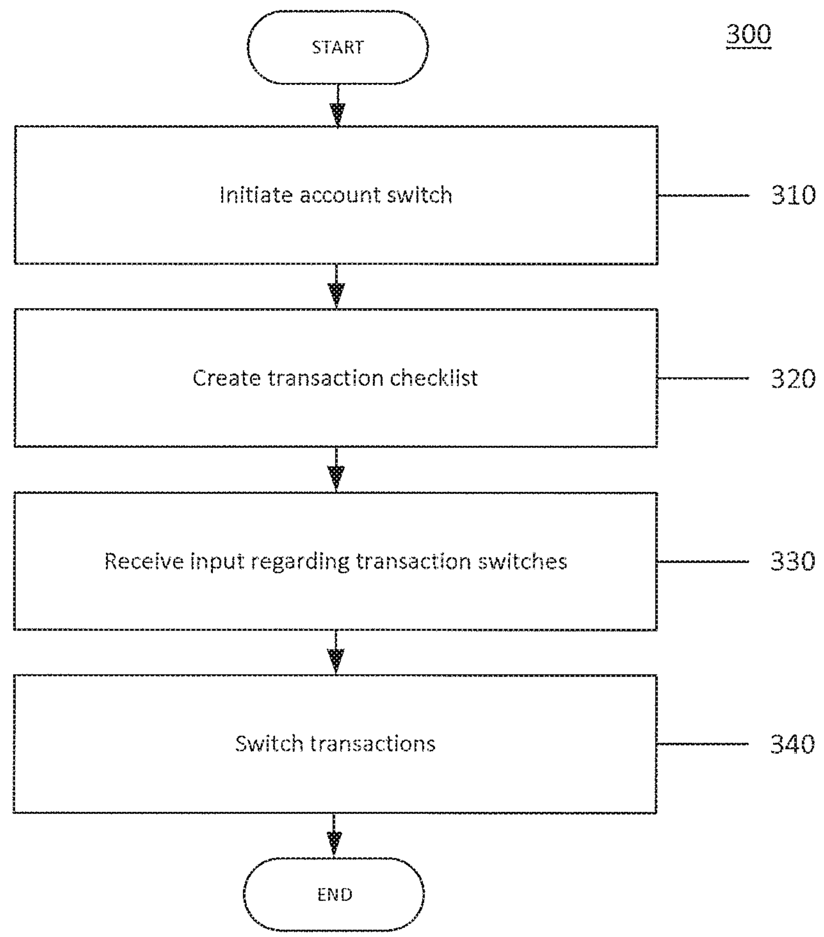
FIG. 3 is a flowchart of an exemplary process switching transactions associated with financial accounts, consistent with disclosed embodiments.

FIG. 3 illustrates an exemplary process 300, consistent with disclosed embodiments. In one embodiment, account switch management system 102 may execute software instructions to at least partially perform process 300 to manage an account switch. In an exemplary embodiment, a customer (e.g., user 112) may decide to switch financial service providers and arrange to close or otherwise cease or lessen use a financial account maintained by a financial service provider ("old account") in favor of a financial account maintained by financial service provider 110 ("new account"). Account switch management system 102 may receive input from the customer and execute or arrange to execute instructions that perform process 300 to manage the account switch, which may ensure that the account switch is efficient (e.g., that all transactions that happen during the process of the account switch occur, and occur as desired).

In order to execute an account switch, account switch management system 102 may initiate or receive instructions to initiate the account switch (step 310). The customer may operate client device 120 to input instructions to initiate the account switch. For example, the customer may operate client device 120 to execute instructions that open a user interface (e.g., a web page, mobile app, etc.) on client device 120, which may be configured to communicate with account switch management system 102, such as through network 140 and/or an API. The user interface may be provided by financial service provider 110, which may maintain the new account. The customer may choose to initiate an account switch through input to client device 120.

In one example, the customer may operate client device 120 to open a web page provided by financial service provider 110. The customer may have previously opened the new account with financial service provider 110 or may proceed to do so. After the new account has been opened, the customer may choose to execute a process that initiates the account switch via account switch management system 102. For example, the customer may sign up for an account switch management service or may simply select an account switch management tool provided on the web page. Account switch management system 102 may receive the request for initiation of an account switch.

To execute the account switch, account switch management system 102 may coordinate with and/or instruct account switch data engine 104 to create a checklist of transactions that may or will be required to switch from the old account to the new account (step 320). Account switch data engine 104 may be a component that includes software instructions (e.g., programs, algorithms, etc.) that are executed by account switch management system 102 (or another system). Alternatively, account switch data engine 104 may be a separate computing system with one or more processors that execute software instructions to perform processes consistent with aspects relating to the functions of account switch data engine 104. For example, account switch management system 102 may execute software that determines one or more transactions that the customer wants to take place through the new account in the future (e.g., switching of a bill pay or direct deposit to the new account). Client device 120 may receive input from the customer and perform one or more processes to transmit information about the old account (e.g., transaction history) to account switch management system 102. Account switch data engine 104 may process the information to determine a checklist of suggested transactions that the customer may want to switch to the new account. The list of suggested transactions may be provided to the customer via client device 120 (e.g., displayed to the customer via a display device associated with or connected to client device 120).

After account switch management system 102 determines the list of transactions that may be switched, the customer may interact with the account switch management system 102 to arrange for the switch of one or more of the suggested transactions (step 330). The customer may provide input to client device 120 to select from the list of suggested transactions and provide account switch management system 102 with information, such as which transactions to switch and when to switch them. For example, the customer may select a bill payment transaction and instruct account switch management system 102 to immediately begin a process of switching the bill payment from the old account to the new account (i.e., future payments be made from the new account instead of the old account).

Account switch management system 102 may execute software to perform one or more processes to provide recommendations to the customer regarding which transactions to switch and when to switch them. In addition, account switch management system 102 may offer additional services associated with the account switch, such as an option to transfer funds from the old account to the new account (or vice versa) or an option to schedule or execute a transaction (e.g., schedule a bill payment). The recommendations and additional services may be provided to the customer via client device 120. The customer may take these into account when instructing account switch management system 102 to switch transactions.

Account switch management system 102 may instruct a switch tool to perform one or more processes that carry out the transaction switches from the old account to the new account (step 340). In an exemplary embodiment, the switch tool may be another computing system associated with financial service provider 110. Alternatively, switch tool may be software executed by account switch management system 102 to perform one or more switch processes consistent with the disclosed embodiments. In one embodiment, the switch tool may communicate with third-party devices 130 to execute one or more processes to switch future transactions associated with the third-party such that they occur using the new account. The one or more processes may vary depending on the transaction being switched and the associated third-party. In one aspect, the one or more processes may include one or more processes that are necessary to perform the switch of transactions. In one example, the switch tool may automatically update payment information (e.g., account number, financial service provider, etc.) stored by a third-party device 130. In another example, the switch tool may provide instructions to a user associated with a third-party device 130 for switching the account to be used for future transactions. In yet another example, the switch tool may provide instructions to the customer (e.g., user 112) for switching a transaction with a third party to the new account.

The disclosed embodiments may be configured to enable a customer to instruct account switch management system 102 to perform process 300 to switch transactions from an old account to a new account. It should be understood that the input required by or requested from the customer may vary. For example, the customer may choose to allow account switch management system 102 to automatically generate a list of transactions to be switched, determine when to switch each transaction, and coordinate with a switch tool to switch the transactions. In other examples, the disclosed embodiments may execute software that allows the customer to choose which transactions to switch and choose when to switch them.

Figure 4:
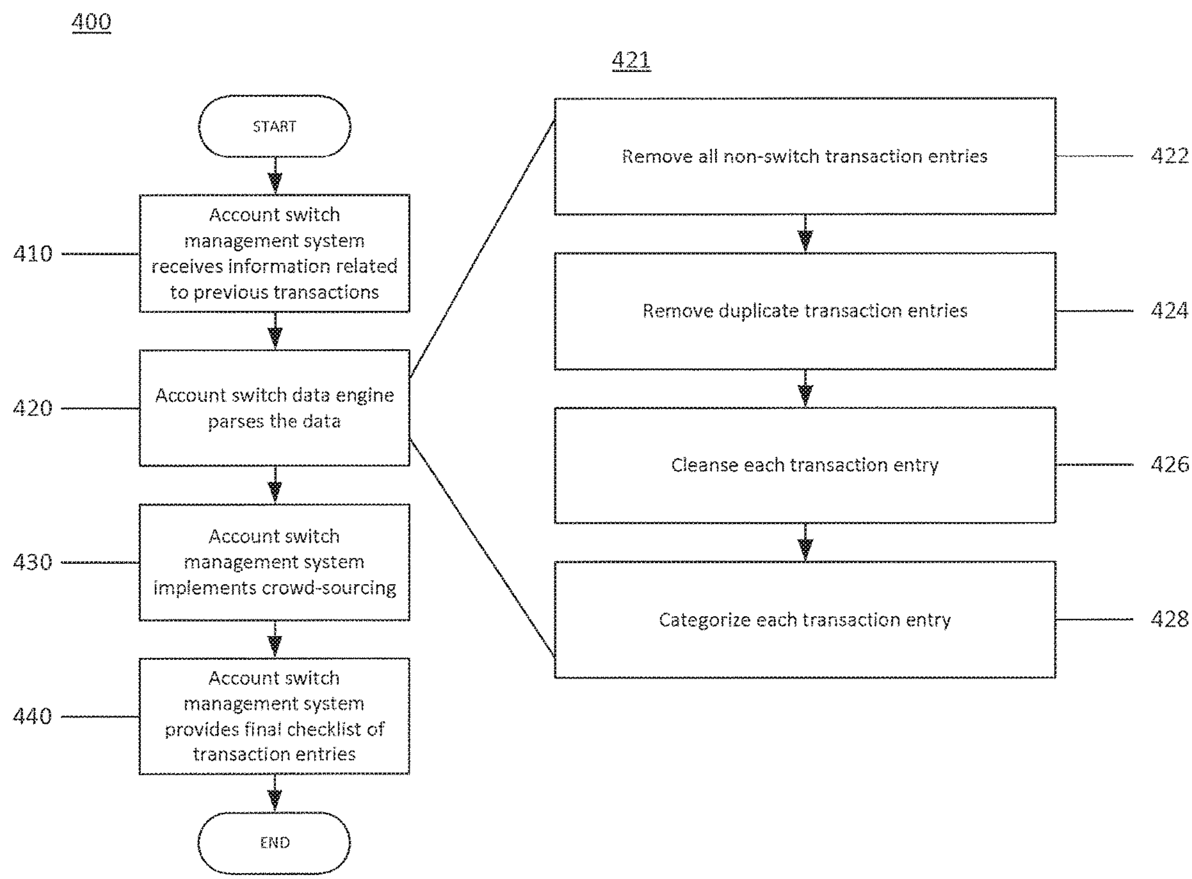
FIG. 4 is a flowchart of an exemplary process for using an account switch data engine, consistent with disclosed embodiments.

FIG. 4 illustrates an exemplary process 400, consistent with disclosed embodiments. In one embodiment, account switch management system 102 may perform process 400 to generate a checklist of suggested transactions to be switched using account switch data engine 104. The checklist of suggested transactions may inform the customer of which transactions associated with one or more old accounts may need to be switched to avoid unwanted transactions occurring through an old account.

In order to determine which transactions may need to be switched, account switch management system 102 may receive information related to previous transactions made by the customer (step 410). In an exemplary embodiment, account switch management system 102 may receive all transaction data associated with an old account. For example, account switch management system 102 may communicate with a third-party device 130 associated with a financial service provider that maintains the customer's old account. The third-party device 130 may send the transaction data to account switch management system 102 for use by account switch data engine 104.

The transaction data may be in the form of multiple transaction entries that each include transaction information. The transaction information may include a transaction description (e.g., what the transaction is and when it occurred), third-party information (e.g., a merchant to which a payment is made), amount information, date processed information, recurrence information, etc. In some embodiments, before being received by account switch management system 102, the transaction information may be processed by an enhanced transaction filter, which may break down the supplied transaction information into separate pieces of data that fit into one or more of these categories.

Client device 120 may be configured to execute software instructions to perform one or more processes that enable the customer to arrange for the transaction data to be sent to account switch management system 102. For example, financial service provider 110 may generate a user interface that may include an option for the user to log in to their old account through the account switch management system 102. Data may be transferred through account switch management system 102 to and from a third-party device 130 associated with the financial service provider that maintains the old account. The customer may provide input to authorize the third-party device 130 to transmit the transaction data to the account switch management system 102 (e.g., username and password for the old online account).

The transaction data received by account switch management system 102 may include all transactions made using the old account over a selected period of time, or some selected subset of all transactions (e.g., all payments, all deposits, etc.). In order to determine which transactions are transactions that the customer may want to switch to the new account, account switch data engine 104 may parse the transaction data (step 420). Account switch data engine 104 may parse the data using one or more processes, programs, algorithms, crowd-sourced information from one or more users (e.g., financial service provider employees and/or customers), etc. to determine which transactions are likely associated with a current or future transaction that may need to be switched to the new account. In order to determine these transactions, account switch data engine 104 may execute software instructions to perform sub-process 421.

In some embodiments, through sub-process 421, account switch data engine 104 may transform the transaction data to create the final checklist of suggested transactions to switch. To generate the checklist, account switch data engine 104 may filter the transaction data to exclude all transactions that are not associated with an account switch (step 422). In certain aspects, transactions that are not associated with an account switch may include any transactions that are not related to a potential future transaction using stored account information (e.g., non-recurring transactions). In other aspects, transactions that are not associated with an account switch may include any transactions that are not related to bill payments or direct deposits. For example, these excludable types of transactions may include point-of-sale purchases by the customer using their debit card associated with the old account. Such a purchase is not related to a future transaction (e.g., bill payment). These transactions may be removed through identification of the third-party associated with the transaction. For example, purchase transactions at a merchant such as a restaurant, grocery store, convenience store, etc., can be removed. These "one-off" transactions may be identified by account switch data engine 104 and removed from consideration for the checklist.

Account switch data engine 104 may also transform the transaction data to remove duplicate transactions (step 424). This may take place before or after removing all non-switch transactions. Since transactions that may need to be switched are likely to be recurring transactions (e.g., monthly payments or direct deposits), the transaction data received by account switch data engine 104 may include duplicate transaction entries that represent the same transaction to be switched. For example, account switch data engine 104 may identify a plurality of transaction entries each as electric bill payments for different months. In one example, account switch data engine 104 may remove all but one (e.g., the most recent) of the plurality of transaction entries. In another example, account switch data engine 104 may combine the related transaction entries into a single transaction entry and estimated monthly payment posting date to be added to the checklist.

Account switch data engine 104 may also cleanse each transaction entry (step 426). This process may take place after the transaction data has been narrowed down to transaction entries that each represent a different transaction to be switched (e.g., after filtering unassociated transactions and removing duplicates). Cleansed transaction entries may include information that can be associated with a particular transaction, such that it is known what the transaction data represents and what related future transactions may occur. In this way, account switch management system 102 may be able to display a meaningful transaction entry to the customer as part of the checklist (e.g., so that the customer knows what the transaction is) and may be able to arrange for a switch tool to switch the transactions (e.g., change future transactions to go through the new account).

Account switch data engine 104 may receive a raw data transaction entry and execute instructions to transform it into a cleansed transaction entry. For example, a transaction entry such as 2045 VZWRLSS DESCR: EPAY IDN:NAME may be translated into "Verizon Wireless." The cleansed transaction entry may be in a form that is more meaningful to the customer because, for example, it may be easier to recognize the transaction that may need to be switched (e.g., cell phone bill). Further, the cleansed transaction entry may be in a form that allows for additional processing to be automated (e.g., connection to a Bill Pay API).

Cleansing of transaction entries may be completed via one or more manual and/or automated processes. In one example, a user (e.g., an employee of financial service provider 110) may manually review transaction entries to create matching entries that identify specific transaction information, such as merchant name, merchant location, transaction amount, etc. The matched transaction entry may be stored in a database. Based on the matched entry, an algorithm may be created to automatically cleanse subsequent similar transaction entries.

In addition or alternatively, account switch management system 102 may execute instructions to automatically cleanse transaction entries by a process (e.g., program, algorithm, etc.) that removes unrelated and commonly occurring alphanumeric codes, such as payment channel codes, (e.g., ePayment, online payment, ACH payment codes, etc.) and account identifier codes (e.g., IDN, customer name, etc.), to leave only the portion of the transaction entry that includes particular transaction information (e.g., merchant name, merchant location, etc.).

Further, account switch data engine 104 may "learn" how to cleanse particular transactions based on feedback from use of account switch management system 102. For example, if a threshold number of users (e.g., customers) manually edit a particular transaction entry in a certain way (e.g., corrects merchant name), account switch data engine 104 may add to or modify instructions associated with cleansing similar transaction entries. In some embodiments, a user (e.g., an employee of financial service provider 110) may edit an associated algorithm based on the user's feedback, as necessary. In this way, future similar transaction entries may be automatically cleansed in a manner that reflects common edits made by customers.

In addition to cleansing the transaction entries, account switch data engine 104 may categorize each transaction entry (step 428). For example, each transaction entry may be categorized as direct deposit, bill paid through biller through an ACH, bill paid through biller through a debit card, and bill paid through bill pay system (by paper check or electronically). Categorization may also include a category indicating possible future transactions, such as whether transactions are one-off or recurring. Categorization of each transaction to be included in the checklist may allow account switch management system 102 to make recommendations regarding when a transaction should be switched, as well as assisting a switch tool in determining how to switch a transaction.

Account switch data engine 104 may execute software instructions to perform sub-process 421 to generate a preliminary checklist of suggested transactions to be switched. The preliminary checklist may include a list of identified transactions that the customer will likely need to switch in order to ensure that future transactions occur as desired. Additional processing may occur via process 400 to further refine the preliminary checklist to ensure that all transactions to be switched are properly accounted for.

In one aspect, to refine the preliminary checklist, account switch management system 102 and account switch data engine 104 may use crowd-sourcing to improve the checklist (step 430). The crowd-sourcing may include manual correction, addition, subtraction, etc. of entries included in the preliminary checklist. In one aspect, the crowd-sourcing function may allow for review by a user associated with financial service provider 110. For example, account switch management system 102 may supply the preliminary checklist to a designated user that may consider the checklist and determine if any changes should be made. For example, a designated user may determine that a non-switch transaction (e.g., a one-time retail purchase) was erroneously included in the checklist, and remove the transaction entry. Similarly, the user may determine that a normal switch transaction (e.g., direct deposit) is not included in the preliminary checklist and proceed to check the raw transaction data to determine if such a transaction was missed, and add it, if necessary. Other functions may include correcting cleansed and categorized transactions and/or adding missing information. Account switch management system 102 may receive input from the designated user and execute software instructions to complete the requested modifications.

In another aspect, the crowd-sourcing function may include the customer (e.g., user 112) providing input to modify the preliminary checklist. For example, client device 120 may provide the preliminary checklist to the customer. The customer may review the preliminary checklist to determine if any corrections, additions, subtractions, etc. are necessary. Similarly, the customer may add any transaction entries that were not associated with the old account but will need to be added to the new account. Client device 120 may receive input from the customer to modify the preliminary checklist and transmit associated data to account switch management system 102, as necessary.

The crowd-sourcing function may allow for increased reliability of account switch management system 102, in that all transactions may be accounted for before being switched to the new account. In addition, the crowd-sourcing function may allow account switch management system 102 to identify mistakes or omissions by account switch data engine 104 and may store information that allows account switch data engine 104 to account for the mistakes in the future 104. In this way, the crowd-sourcing function may act as a feedback loop that improves process 400 and sub-process 421. In order to achieve this functionality, account switch management system 102 may store changes made by users in memory and execute software instructions to recognize similar mistakes in the future and correct them. In this way, account switch data engine 104 may supplement sub-process 421 with processes, programs, algorithms, etc. that help account switch data engine 104 efficiently generate a preliminary checklist that requires little or no user input.

After the preliminary checklist has been generated and any user input has been used to modify it, account switch management system 102 (e.g., via account switch data engine 104) may provide the preliminary checklist to the customer as a final checklist of transactions to be switched (step 440). In one embodiment, account switch management system 102 may transmit the final checklist to client device 120 for display to the customer (e.g., user 112) via a display device associated with or connected to client device 120.

In certain embodiments, the checklist may be an identification tool for the customer to easily identify the transactions that need to be switched from their old account. In other exemplary embodiments, the checklist may be an interactive tool that identifies these transactions and allows the user to arrange for the switches to occur. In this way the checklist may serve as a component of an account switch manager, which will be described in more detail.

Figure 5:
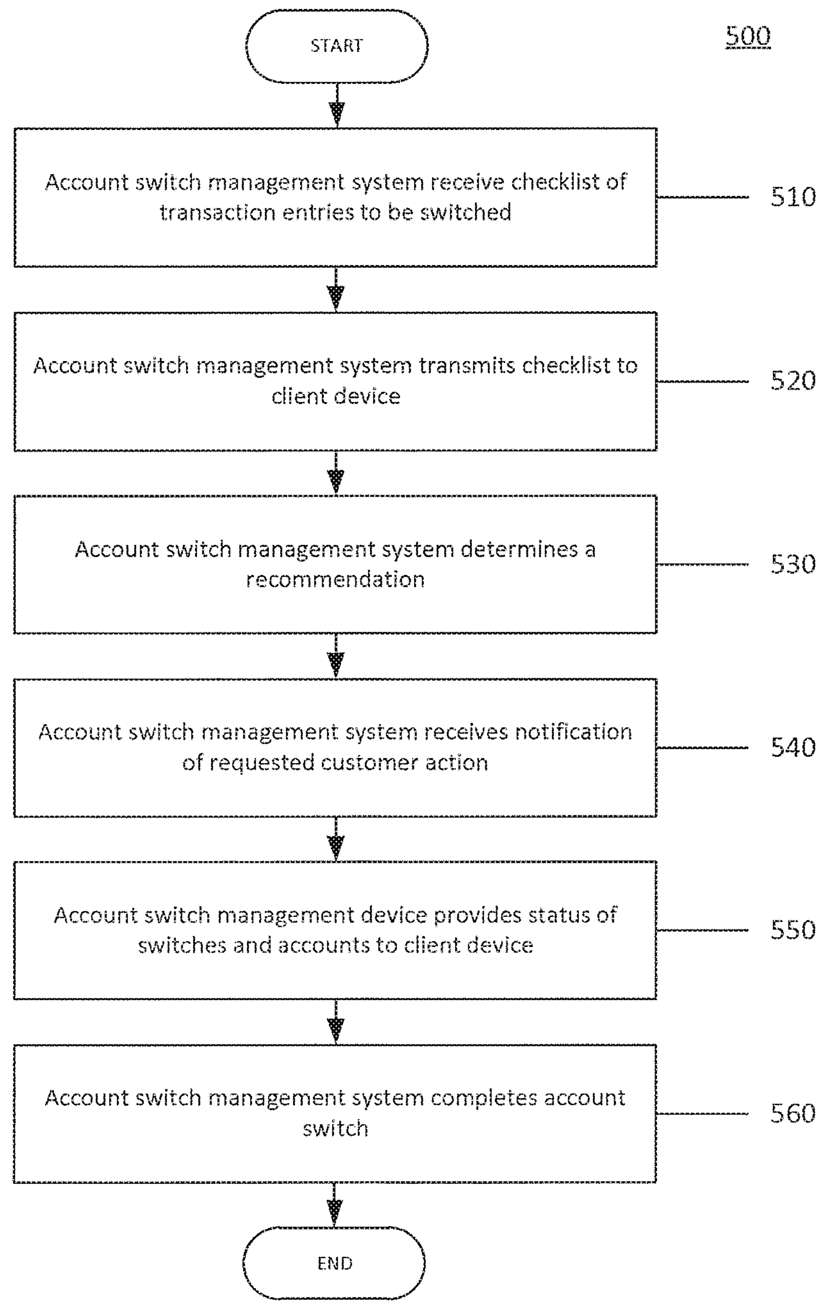
FIG. 5 is a flowchart of an exemplary process for managing an account switch, consistent with disclosed embodiments.

FIG. 5 illustrates an exemplary process 500, consistent with disclosed embodiments. In one embodiment, account switch management system 102 may perform process 500 to manage the switching of accounts for a customer. In one aspect, process 500 may allow a user to organize the switching of accounts such that switching of transactions occurs efficiently and as desired. In another aspect, account switch management system 102 may perform process 500 to execute software instructions and coordinate with one or more of client device 120 and/or third-party device 130 to switch one or more transactions associated with the customer accounts.

In one embodiment, account switch management system 102 may receive a checklist of transactions to be switched (step 510). In one exemplary embodiment, the checklist of transactions may be the final checklist generated by account switch management system 102 and account switch data engine 104, after performing process 400. In alternative embodiments, the checklist may be completely or partially generated by another source (e.g., the customer) and transmitted to a component of account switch management system 102. A processing component of account switch management system 102 may receive the checklist from a memory component of account switch management system 102, a client device 120, a third-party device 130, or a combination of these components.

Account switch management system 102 may transmit the checklist to client device 120 for display to the customer (e.g., user 112) (step 520). Client device 120, via the checklist, may present to the customer all of the transactions that may need to be switched from the customer's old account to the customer's new account. In addition, account switch management system 102 may receive account information for each of the old account and the new account and may also transmit this information to client device 120 for display to the customer. For example, client device 120 may receive and display the account balance for each of the old account and the new account. It should be understood that account switch management system 102 may receive the account information from the financial service provider (e.g., financial service provider 110) associated with the account.

Further, it should be understood that the manner in which information is displayed to and received from the customer may depend on the arrangement of client device 120. In an example in which client device 120 is a laptop or desktop computer, interaction with the customer may take place via a web page. In another example in which client device 120 may be a mobile device such as a smart phone or tablet, interaction with the customer may take place via a mobile application.

In addition to transmitting the checklist and account information, account switch management system 102 may also determine a recommendation (step 530). The recommendation may relate to a potential future customer action associated with the old account and/or the new account. For example, the recommendation may include a recommended date for switching each particular transaction, or a recommendation that the transaction switch not be initiated until the next payment is made.

Account switch management system 102 may determine when to switch a bill pay transaction based on one or more previous payment dates or currently scheduled future payment dates. For example, if a particular bill is scheduled to be paid in 2 days (or other determined threshold length of time), account switch management system 102 may recommend that the transaction be switched after the current bill has been paid using the customer's old account. In this way, delays in payment associated with switching of accounts may be avoided and the payment may be more likely to be received on time. Similarly, account switch management system 102 may determine which transaction, if any, is associated with a direct deposit (e.g., the customer's paycheck) and recommend that that transaction be switched last, after all other transactions have been switched.

In another example, the recommendation may be to transfer a particular amount of money from the old account to the new account or from the new account to the old account. Account switch management system 102 may execute software instructions to determine that one of the customer accounts may have insufficient funds (e.g., to make a scheduled payment). Account switch management system 102 may recommend that the customer transfer money to that account to deposit sufficient funds. In yet another example, account switch management system 102 may determine a recommendation that the customer authorize a payment transaction (e.g., to pay a bill that is due from one of the accounts).

Consistent with the disclosed embodiments, account switch management system 102 may provide a customer with the checklist of transactions to be switched, account information, recommendations, etc. The customer may use this information, and any other relevant information, to make choices on if and when to switch each transaction on the checklist, as well as other actions (e.g., money transfers, bill payments) to request. Account switch management system 102 may receive input from the customer and execute software to perform one or more processes to complete (or arrange to have completed) an action requested by the customer. Account switch management system 102 may receive a notification with the requested action from client device 120 (step 540). One exemplary action may include the customer selecting a transaction to be switched and requesting that the switch be completed. For example, the customer may select a particular bill pay transaction (e.g., electric bill) and request that it be switched from their old account to their new account. The customer may input this action to client device 120, which may send the request as a notification to account switch management system 102. Account switch management system 102 may execute instructions to arrange for the transaction to be switched. In one example, account switch management system 102 may arrange for a switch tool to automatically switch the transaction via communication with a third-party device 130 associated with the merchant that receives the payment for the bill (e.g., the electric company). In another example, account switch management system 102 may determine a manual process for switching the transaction and may transmit the instructions for carrying out that process to client device 120 for display to the customer.

Another exemplary action may include a transfer of funds between the old account and the new account. The customer may be planning to make a payment from their new account (e.g., debit card purchases, pay bills that have already been switched to the new account). In order to ensure that sufficient funds are in the new account, the customer may input to client device 120 a request to transfer funds from their old account to their new account. Account switch management system 102 may receive this request and arrange for it to be completed. For example, account switch management system 102 may execute software instructions to communicate with the financial service provider(s) associated with the accounts and arrange for the transfer of funds to take place. In an exemplary embodiment, account switch management system 102 may be configured to execute software instructions to perform an expedited transfer process that allows the funds to be available in the recipient account in a short amount of time (e.g., immediately, same-day, etc.).

In addition to receiving data instructions related to requested customer actions, and performing one or more processes to complete the requested customer actions, account switch management system 102 may provide information related to the current status of the switches and the accounts to client device 120 (step 550). This information may be transmitted to client device 120 for display to the customer. For example, account switch management system 102 may determine which transactions have yet to be switched, which are in the process of being switched, and which transaction switches have been completed. In addition, account switch management system 102 may update recommendations for when to execute transaction switches, as well as to provide additional recommendations, such as an amount of money to transfer from one account to another. In this way, account switch management system 102 may perform one or more processes that allow the customer to transfer funds from one account to another such that sufficient funds may be present in each account to cover any expected payments that will be made. In addition, account switch management system 102 may recognize any potential issues (e.g., low balance) and alert the customer (via client device 120) that further action (e.g., deposit of additional funds) may be necessary to cover future payments (e.g., scheduled payments from one of the accounts).

In one example, as long as the two accounts remain open, the customer may utilize account switch management system 102 to manage transactions and transfers associated with each account. After all transaction switches have been completed, account switch management system 102 may complete the account switch (step 560). In one example, the completion of all transaction switches may be indicated by the completion of the account switch. In another example, account switch management system 102 may arrange for the old account to be closed, which may include communicating with the financial service provider that maintains the old account or providing the customer with instructions regarding closure of the old account. Similarly, the customer may close the old account without prompting and inform account switch management system 102 of the closure (e.g., via client device 120). In some embodiments, account switch management system 102 may send a notification to a client device 120 associated with the customer (e.g., via text message, e-mail, postal mail, etc.), indicating that the account switch has been completed.

It should be understood that process 500 is only representative of an exemplary manner in which the customer may use account switch management system 102 to manage a switch of accounts. Other processes, steps, actions, not described with respect to process 500 may be included, according to the particular details of the customer, the accounts, the features of account switch management system 102, etc. Further, it should be understood that any steps or processes associated with account switch management device 102 may be at least partially carried out by one or more client devices 120 and/or third-party device 130.

Account switch management system 102 may perform processes that generate and provide through user interface(s) additional features that may be used by the customer. For example, account switch management system 102 may communicate with one or more third-party devices 130 and client device 120 to allow the customer to schedule a payment to a third-party (e.g., a merchant) through the old or new account. In another example, account switch management system 102 may calculate a projected balance of the old and/or new account based on known items such as scheduled payments, average spending habits, required or desired minimum balances, etc. The projected balance and the items used to calculate the projected balance may be presented to the customer for consideration in making transaction switches, transfers of funds, and use of funds.

FIGS. 6-9 illustrate exemplary user interfaces that may be provided to the customer, such as via client device 120, for display and entry of information associated with management of an account switch using account switch management device 120. The exemplary interfaces depict an interactive checklist in the process of completing an account switch from an old account to a new account.

Figure 6:
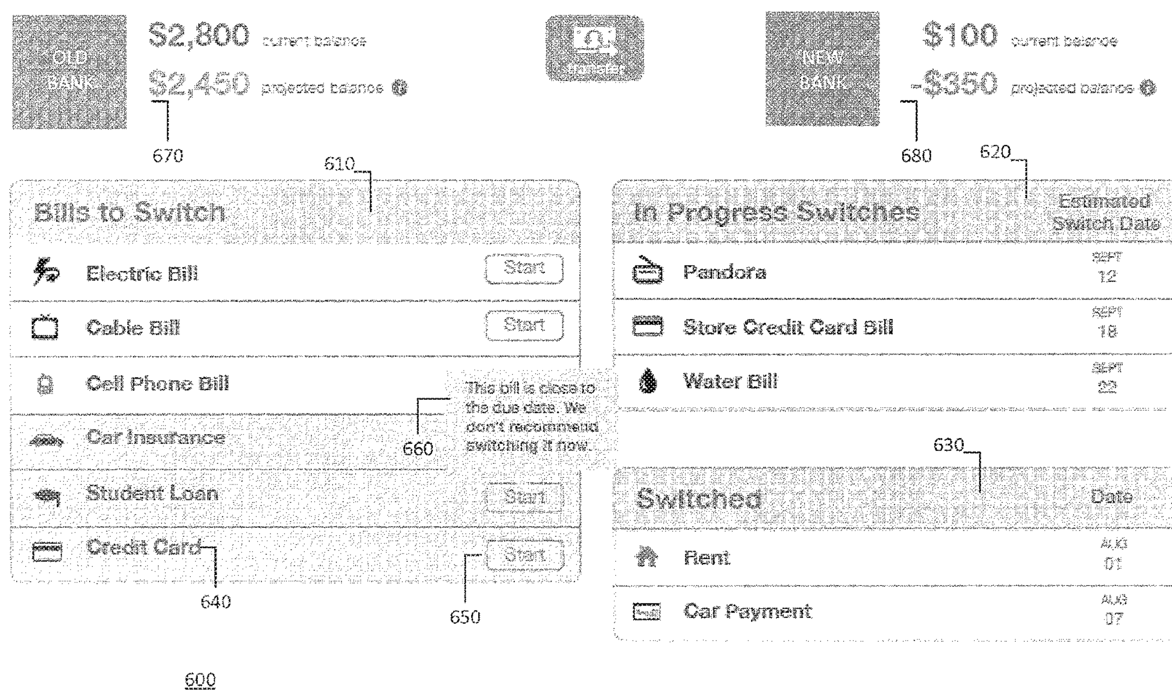

FIG. 6 illustrates exemplary user interface 600 that may be displayed to a customer (e.g., user 112) using client device 120. User interface 600 includes a checklist of transactions that may be switched using account switch management system 102. The checklist of transactions may include a list of bills to switch 610, which may include bills or other transactions for which switches have not been initiated. The checklist of transactions may also include a list of in process switches 620, which may include transactions for which a switch has been initiated, but not yet completed. The checklist of transactions may also include a list of switched transactions 630, which may include transactions for which a switch has been completed. Each entry of the checklist may include an identifier 640, which may be the result of the cleansing process in detailed in process 400 (e.g., Verizon Wireless) or may be a generic identifier associated with the cleansed transaction entry (e.g., Cell Phone Bill). The identifier may include a logo, such as a logo associated with a merchant associated with the transaction. Each identifier may have an associated button 650 that may be selected by the customer, such as to initiate (or cancel) the switch.

User interface 600 may also include a recommendation 660 regarding the switch of one or more transactions. Recommendation 660 may be calculated by account switch management system 102 and provided to the customer for consideration in determining when to switch particular transactions.

User interface 600 may also include old account information 670 and new account information 680. Old account information 670 may indicate the financial service provider that maintains the old account, the current balance of the old account, and a projected balance of the old account, which may be calculated based on information regarding future use of the account. New account information 680 may similarly indicate the financial service provider, account balance, and projected account balance.

FIG. 7 illustrates another exemplary user interface 700 consistent with disclosed embodiments. In addition to the features included with user interface 600, user interface 700 depicts an additional functionality that may allow a customer to prevent insufficient funds in their new account. For example, user interface 700 may include an alert 710 indicating that the customer may not have sufficient funds in their new account to pay a bill (e.g., credit card bill). In this way, the customer may consider depositing or transferring funds to their new account.

In addition to the alert 710, user interface 700 may include a transfer feature 720 that may allow a user to arrange for the transfer of funds from one account to another. The customer may operate client device 120 to enter an amount to transfer, the account to transfer from (e.g., the old account), and the date on which the transfer is to occur. The customer may initiate the transfer, which may be sent to account switch management device 102, which may carry out the transfer.

FIG. 8 illustrates another exemplary user interface 800 consistent with disclosed embodiments. In addition to the features included with user interface 600, user interface 800 depicts an additional functionality that may allow the customer to schedule a payment associated with the transaction. For example, user interface 800 pay include a payment feature 810 that allows the user to arrange for a payment to be made. The customer may enter an account number, payment date, and payment amount by operating client device 120. The customer may then initiate the payment, which may be executed by account switch management system 102 (in communication with third-party devices 130). In an exemplary embodiment, the user may be prompted to make the payment based on a recommendation that the transaction not yet be switched because the bill is almost due. An alert 820 may be included to indicate that switching is not recommended at that time.

Figure 9:
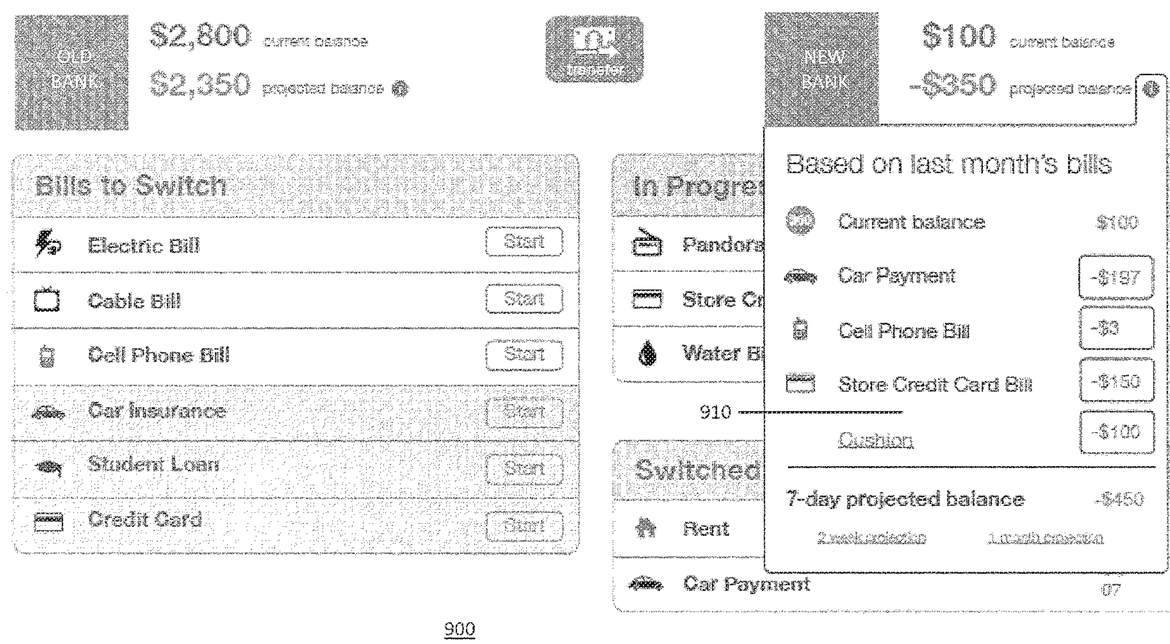

FIG. 9 illustrates another exemplary user interface 900. In addition to the features included with user interface 600, user interface 900 depicts a breakdown 910 of a projected balance associated with the customer's new account. The breakdown 910 may include multiple future transaction entries that may be used to project a future account balance, if each of the transactions were to take place. In addition to future transactions, a cushion may be factored into the calculation, such that a minimum required or desired balance, or an anticipated amount of additional spending may be accounted for in the calculation. As shown in FIG. 9, various lengths of time (e.g., 7 days, 2 weeks, 1 month) may be used for the calculation.

The user interfaces depicted in FIGS. 6-9 should be considered exemplary only and the disclosed embodiments are not limited to the features or arrangement of features shown. Other exemplary user interfaces consistent with the disclosed embodiments may be possible.

Consistent with the disclosed embodiments, account switch management system 102 may be used in some or all of the processes described herein. For example, account switch management system 102 may be used to generate a checklist of transactions to be switched, as well as to execute various processes associated with management of and actual switching of selected transactions. It should be understood however, that other components of system 100 may be used to execute some or all of the associated steps.

The disclosed embodiments may allow a customer to determine which transactions associated with an old account may need to be switched to a new account. Further, simplified and efficient management of the switching of each transaction may be possible. In this way, customers may not be deterred from opening new accounts and may be confident in switching transactions to the new account.

The exemplary disclosed embodiments describe systems and methods for managing a financial account switch. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. For example, while two accounts (one old account and one new account) are described herein, it is possible for more than two accounts to be included and managed by the disclosed embodiments (e.g., one or more old accounts switched to one or more new accounts). The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system comprising:

one or more processors; and one or more storage devices storing instructions that, when executed, configure the one or more processors to perform operations comprising:

receiving transaction data associated with a first account, the transaction data comprising a plurality of transaction entries;

generating a checklist comprising a list of transaction entries by removing duplicated transaction entries and non-recurring transaction entries from the plurality of transaction entries;

transmitting instructions to generate a graphical user interface to a client device, the graphical user interface, in response to being generated by the client device, being configured to display (i) the list of transaction entries in the checklist and (ii) an indication of at least one transaction entry from the checklist having a scheduled payment time occurring within a threshold amount of time of an account switch, wherein the list of transaction entries comprises at least some of the plurality of transaction entries; and receiving, from the client device, instructions to switch one or more transactions in the checklist from the first account to a second account.

2. The system of claim 1, wherein:

the indication further comprises a recommendation for the at least one transaction entry from the checklist having the scheduled payment time occurring within the threshold amount of time to be switched after a respective scheduled payment occurs.

3. The system of claim 1, wherein the operations further comprise:

identifying one or more transaction entries from the list of transaction entries in the checklist that exceed funds in the second account, wherein the graphical user interface is further configured to display a recommendation to transfer funds to the second account.

4. The system of claim 3, wherein:

the graphical user interface is further configured to display an alert message based on the recommendation; and the alert message indicates that the one or more transaction entries from the list of transaction entries in the checklist exceed funds in the second account.

5. The system of claim 1, wherein generating the checklist further comprise:

removing transaction entries associated with recurring and non-recurring point of sale purchases.

6. The system of claim 1, wherein the graphical user interface comprises:

a list comprising a plurality of bills of the checklist; and a plurality of buttons, wherein each of the plurality of bills is associated with one of the plurality of buttons.

7. The system of claim 6, wherein the operations further comprise:

transmitting additional instructions to the client device to update the graphical user interface by modifying the list to indicate one or more bills of the plurality of bills in the list to be switched, one or more bills of the plurality of bills in the list being switched, and one or more bills of the plurality of bills in the list that have been switched.

8. The system of claim 1, wherein the operations further comprise:

categorizing the list of transaction entries in the checklist as at least one of a direct deposit, a bill paid through an ACH, or a bill paid through a debit card.

9. The system of claim 1, wherein removing duplicate transactions entries comprises:

combining duplicate transaction entries from the plurality of transaction entries into a single transaction entry by estimating a value for the single transaction entry based on values associated with the duplicate transaction entries.

10. A computer-implemented method comprising:

receiving transaction data associated with a first account, the transaction data comprising a plurality of transaction entries;

generating a checklist comprising a list of transaction entries by removing duplicated transaction entries and non-recurring transaction entries from the plurality of transaction entries;

transmitting instructions to generate a graphical user interface to a client device, the graphical user interface, in response to being generated by the client device, being configured to display (i) the list of transaction entries in the checklist and (ii) an indication of at least one transaction entry from the checklist having a scheduled payment time occurring within a threshold amount of time of an account switch, wherein the list of transaction entries comprises at least some of the plurality of transaction entries; and receiving, from the client device, instructions to switch one or more transactions in the checklist from the first account to a second account.

11. The method of claim 10, wherein:

the indication further comprises a recommendation for the at least one transaction entry from the checklist having the scheduled payment time occurring within the threshold amount of time to be switched after a respective scheduled payment occurs.

12. The method of claim 10, further comprising:

identifying one or more transaction entries from the list of transaction entries in the checklist that exceed funds in the second account, wherein the graphical user interface is further configured to display a recommendation to transfer funds to the second account.

13. The method of claim 12, wherein:

the graphical user interface is further configured to display an alert message based on the recommendation; and the alert message indicates that the one or more transaction entries from the list of transaction entries in the checklist exceed funds in the second account.

14. The method of claim 10, wherein generating the checklist further comprises:

removing transaction entries associated with recurring and non-recurring point of sale purchases.

15. The method of claim 10, wherein the graphical user interface comprises:

a list comprising a plurality of bills of the checklist; and a plurality of buttons, wherein each of the plurality of bills is associated with one of the plurality of buttons.

16. The method of claim 15, further comprising:

transmitting additional instructions to the client device to update the graphical user interface by modifying the list to indicate one or more bills of the plurality of bills to be switched, one or more bills of the plurality of bills in the list being switched, and one or more bills of the plurality of bills in the list that have been switched.

17. The method of claim 10, further comprising:

categorizing the list of transaction entries in the checklist as at least one of a direct deposit, a bill paid through an ACH, or a bill paid through a debit card.

18. A non-transitory computer-readable medium storing instructions that, when executed by one or more processors, effectuate operations comprising:

receiving transaction data associated with a first account, the transaction data comprising a plurality of transaction entries;

generating a checklist comprising a list of transaction entries by removing duplicated transaction entries and non-recurring transaction entries from the plurality of transaction entries;

transmitting instructions to generate a graphical user interface to a client device, the graphical user interface, in response to being generated by the client device, being configured to display (i) the list of transaction entries in the checklist and (ii) an indication of at least one transaction entry from the checklist having a scheduled payment time occurring within a threshold amount of time of an account switch, wherein the list of transaction entries comprises at least some of the plurality of transaction entries; and receiving, from the client device, instructions to switch one or more transactions in the checklist from the first account to a second account.

* * * * *